Sept. 10, 1968  E. E. MARTIN ET AL  3,401,281
ELECTRIC MOTOR WITH PERMANENT MAGNET STATOR
POLES AND METHOD OF MAKING
Filed March 18, 1966                    2 Sheets-Sheet 1
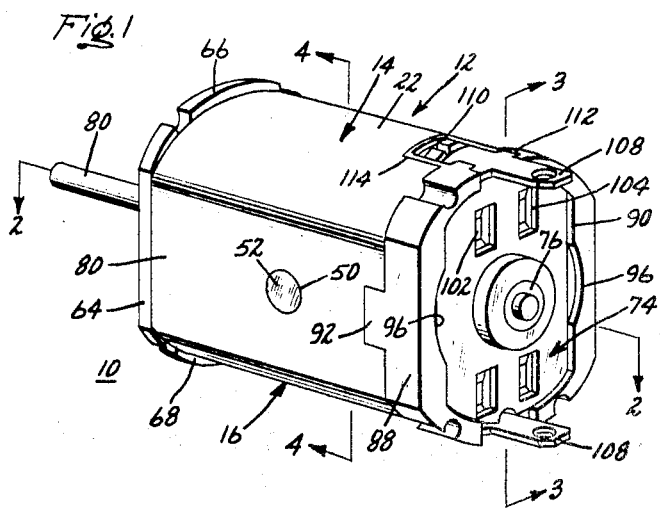
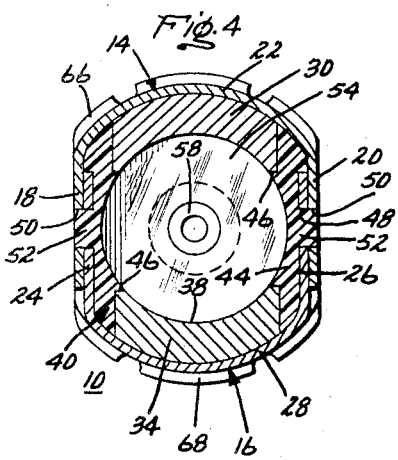
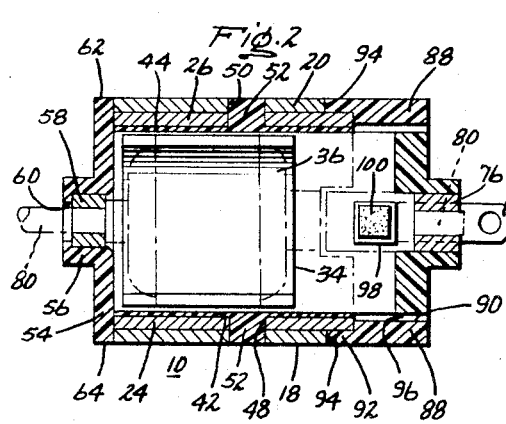
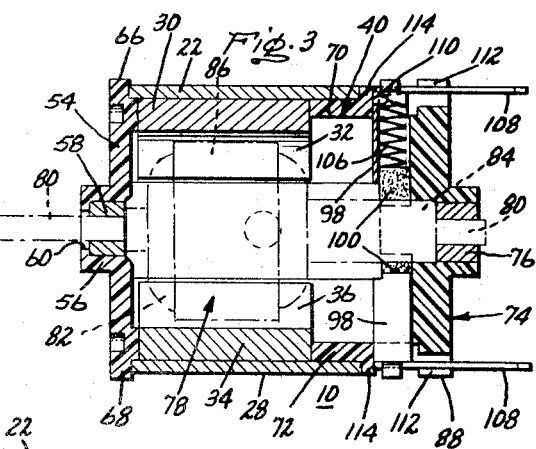
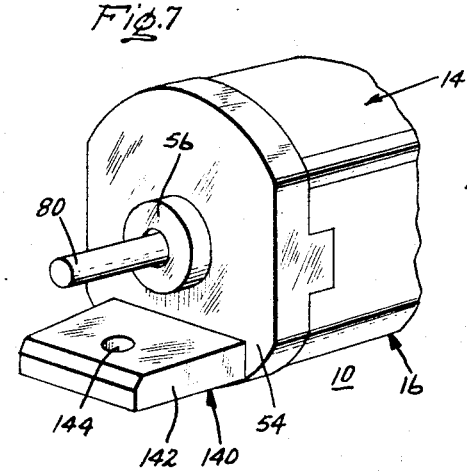
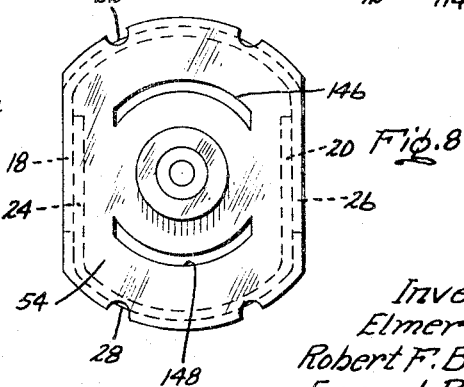
Inventors:
Elmer E. Martin,
Robert F. Brandon,
Ernest R. Summers,
Wladyslaw S. Zagorski,
by A. Sidney Olyer
Attorney.

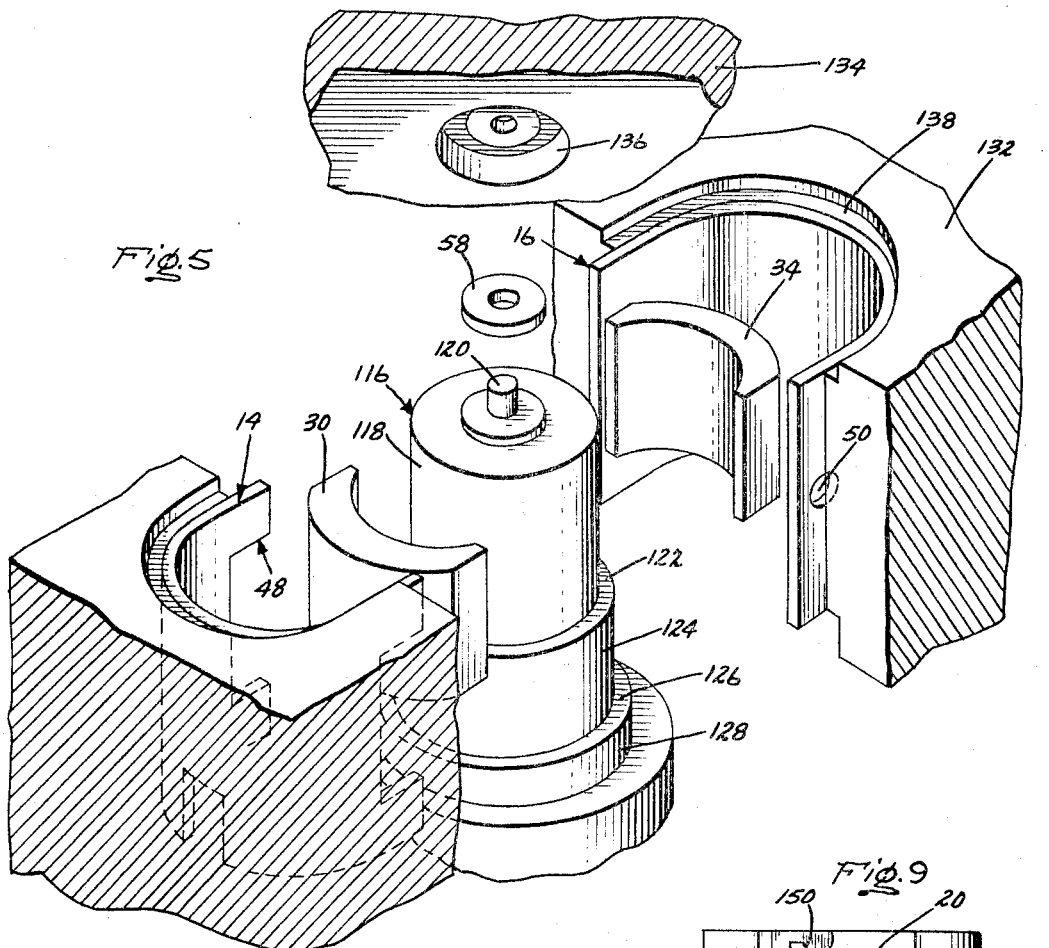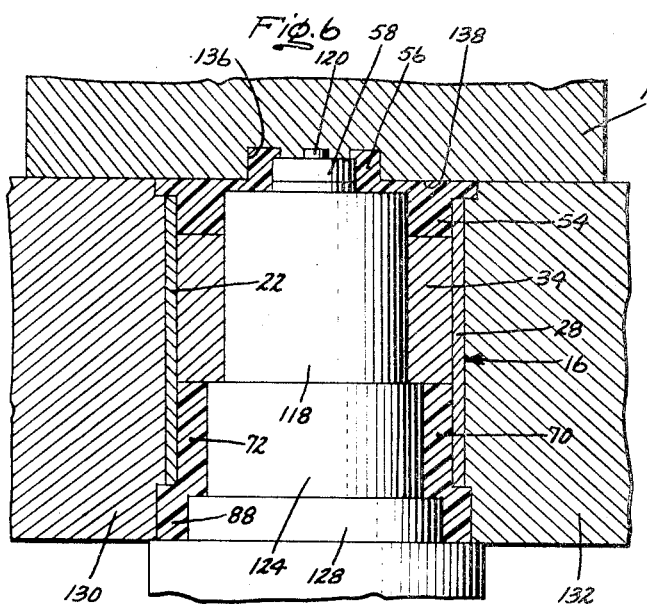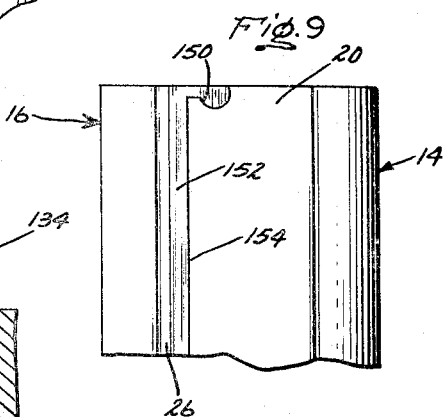

United States Patent Office 3,401,281
Patented Sept. 10, 1968

3,401,281
ELECTRIC MOTOR WITH PERMANENT MAGNET
STATOR POLES AND METHOD OF MAKING
Elmer E. Martin, Robert F. Brandon, Ernest R. Summers, and Wladyslaw S. Zagorski, Morrison, Ill., assignors to General Electric Company, a corporation of New York
Filed Mar. 18, 1966, Ser. No. 535,438
19 Claims. (Cl. 310—42)

This invention relates generally to dynamoelectric machines, and more particularly to improved construction of fractional horsepower electric motors, as well as to an improved method of manufacturing and assembling such motors.

In the past, electric motors and particularly permanent magnet type electric motors have been used in various forms for fractional horsepower applications. Thus, the general operation of these permanent magnet motors is well known. The motor usually includes a stationary member, or stator, concentric with and spaced by a predetermined air gap from a rotatable member, or armature. The stator utilizes one or more permanent magnets to generate a magnetic flux field across the air gap and in the armature, and the armature carries conductors which are externally energized in order to cause relative movement between the stationary stator and rotatable armature.

Prior permanent magnet electric motor have utilized both single or ring type magnets as well as magnetizable segments in order to generate the field flux for the stator. However, of those motors utilizing magnetizable segments, to our knowledge none permits the use of relatively inexpensive segments of loose tolerances in the same motor (i.e., segments of unequal length, of non-uniform cross section, and of unequal radial thickness) so as to provide a motor which is relatively inexpensive, while still achieving a motor which is of unitary and rigid construction, and hence capable of satisfactory operation over long periods of time.

Due to the relatively small size of fraction horsepower motors, it has been difficult to properly align the motor components. For instance, the radial dimension of the air gap, or the distance between the stator bore and the armature is exceedingly small. Hence, in order to provide a fractional horsepower motor with proper air gap dimensions when using magnetizable segments, it is necessary to carefully control the dimension between the segments and to support the armature in the proper location in the bore. This proper support is related to accurate alignment of the end bearings which carry the armature.

We provide, by our invention, one type of fractional horsepower permanent magnet electric motor which we believe will achieve the quality construction desired. Further, our permanent magnet motor is small enough for use in one of various hand-held appliances, rugged enough in construction to withstand being dropped or otherwise impacted, and not subject to many of the shortcomings found in prior motors of this type. Thus, in constructing our motor, as will be brought out in more detail hereinafter, we relate all tolerances to a single, centrally located precision die piece which will provide an accurate bore dimension as well as accurately aligned end bearings. Further, even though we construct our frame out of discrete or separate components, and utilize magnetizable segments of loose tolerance, we are able to provide accurately established, permanent relationships between the components and segments, eliminating the stresses therebetween normally encountered in prior art methods of fabrication. For example, we minimize the twisting forces between the components, eliminating potential misalignment therebetween, thereby eliminating a deficiency of prior art methods of fabrication which in the past prohibited precision manufacture of fractional horsepower motors assembled from more than a single frame component.

We also provide, by our invention an economical method of fabricating a relatively inexpensive, high quality motor from discrete components of wide tolerances. Our method is rapid and inexpensive to practice as it involves few steps, it is accurate as it relates important tolerances to one precision unit, and it is readily adaptable to mass production techniques. The end production of our method of manufacture is thus a relatively inexpensive motor having a constant bore size thereby enabling separately manufactured armature assemblies to be used therewith, while still providing accurate air gaps between the motor stator and the armature. Further, we contemplate the manufacture of motors of various outputs depending upon the utilization, while necessitating only a single set of basic assembly tools for a constant armature configuration.

Accordingly, it is a general object of the instant invention to provide an improved method of fabricating small electric motors, and improved electric motor construction especially adaptable for use in various small hand-held appliances.

It is another object of the present invention to provide a fractional horsepower permanent magnet electric motor and method of assembling or manufacturing the same which furnish at least some of the desirable features and overcomes the major problems mentioned heretofore.

A further object of the present invention is to provide an improved stator-frame assembly for fractional horsepower type permanent magnet electric motors that is extremely rugged in construction, achieves an accurately dimensioned armature-receiving bore, provides accurate alignment both radially and axially of the motor shaft bearings with respect to the armature-receiving bore, and which is thus of high reliability, while also being of relatively low cost.

It is another object of the present invention to provide an improved method of manufacturing or assembling permanent magnet electric motor stator-frame structures from discrete components, that permits the components of the structure to be readily assembled and aligned with respect to each other and which is readily adaptable to mass production techniques.

In accordance with one exemplification of our invention, we have provided an improved fractional horsepower electric motor for operation from a D.C. supply such as a battery. The motor includes a stator-frame assembly composed of discrete components, the components being assembled by holding the outer faces of a pair of spaced apart magnetizable segments firmly against the inner surfaces of the bight section of two metal frame members having a generally U-shape in cross-section. The leg sections of the respective frame members are initially movable with respect to one another, and with respect to a centrally located precision tool or die piece having an outer diametric dimension equal to the desired armature-receiving bore to be established in the stator-frame. The leg sections of the respective frame members are arranged to project towards each other and at least one of the frame members is moved toward the other frame member until portions of one frame member either contact or overlap portions of the other frame member. Movement of the frame members will cease when the magnetizable segments are in contact with the centrally located die piece, this die piece being the reference point to which the two frame members and the two segments are aligned in order to achieve desired axial and radial alignment and dimensional relationships therebetween. In this manner, the magnetizable segments are accurately positioned radially, axially and angularly within the frame members so as to form an armature-receiving bore having the desired dimension, regardless of the length, radial thickness or uniformity of cross section of the segments.

The leg sections of the respective frame members may have apertures therein which are brought into line to provide holes entirely through the frame, angularly between the magnetizable segments and the frame members are placed into engagement with associated back faces of the segments. A sleeve-type bearing is held on a pin located on the die piece which is coaxially aligned with respect to the bore, at one end of the frame members. At this time, with the relative positions between the two frame members, two segments, and the bearing being maintained by a suitable mold, an unhardened thermally responsive plastic material is injected into the mold and thereafter hardened to form the stator-frame assembly.

Once the material has hardened, a stator-frame assembly is formed having a plastic matrix which holds the magnetizable segments in the proper position, with integrally formed plastic rivets extending through the frame holes to lock the overlying leg sections of the two frame members firmly together. Further, an integral end shield is formed at one end of the assembly which mounts the bearing in the desired coaxial relation with reference to the bore. At the other end of the assembly, an accurately dimensioned shoulder is formed for receiving a separately formed end shield assembly having electrical brush means and a second sleeve-type bearing. The magnetizable segments may be suitably magnetized at a preferred stage of assembly of the motor in order to provide the field flux.

A suitable armature assembly such as, for example, that disclosed in the copending application of R. W. Dochterman, Ser. No. 356,904, now U.S. Patent 3,278,776, assigned to the same assignee as this application, and including a commutator and armature secured to a shaft is installed within the stator-frame assembly by first being positioned in the first mentioned bearing. The second end shield is then mounted on the aforementioned shoulder with the commutator portion of the shaft in the second mentioned bearing. The shoulder is thus utilized to attain proper alignment of the second bearing with respect to the other motor components. Finally, suitable brushes, springs, and brush terminals are installed onto the second end shield section to complete the motor.

We provide by this improved manufacturing method, a motor having a stator-frame assembly with an accurate armature-receiving bore dimension, accurately aligned end bearings, and a unitary frame which provides a low reluctance path for the flux, the frame assembly thus functioning as a portion of the motor stator. The frame components are all accurately aligned by reference to a single precision die piece, and the means of fastening together the frame components insures that a minimum of twisting forces or stresses will be set up between the frame components, so as to maintain such alignment after the die piece is removed.

The subject matter which we regard as our invention is set forth in the appended claims. The invention itself, however, together with further objects and advantages thereof, may be better understood by referring to the following description taken in connection with the accompanying drawings in which:

FIGURE 1 is a perspective view of the motor exemplifying one form of our invention;

FIGURE 2 is a horizontal sectional view taken substantially on the plane of the line 2—2 of FIGURE 1;

FIGURE 3 is a vertical sectional view taken substantially on the plane of the line 3—3 of FIGURE 1;

FIGURE 4 is a vertical sectional view taken substantially on the plane of the line 4—4 of FIGURE 1;

FIGURE 5 is an exploded perspective view illustrating the motor frame supported in an exemplary mold and showing the relationship of the component parts and illustrating the manner in which the motor is assembled;

FIGURE 6 is a vertical sectional view, with parts in elevation through the mold illustrated in FIGURE 5, and illustrating the motor frame in another stage of assembly;

FIGURES 7 and 8 illustrate modified end shield structures for use with the motor illustrated in FIGURES 1–4; and FIGURE 9 illustrates a modified manner of fastening together several components of the frame structure comprising one form of our present invention.

Referring now more particularly to the accompanying drawings in which like numerals indicate like parts throughout the several views, we have identified the electric motor embodying one form of the invention generally by the reference numeral 10.

As is best seen in FIGURES 1–4, the motor 10 includes a frame generally denoted by reference numeral 12, including a pair of frame or bracket sections 14 and 16. The bracket sections 14 and 16 are substantially similar in construction, each being generally U-shaped in cross-section. Thus, the bracket section 14 includes a pair of generally parallel spaced apart legs 18 and 20 connected by a bight 22 which is generally arcuate in shape. The bracket section 16 also includes a pair of generally parallel spaced apart legs 24 and 26, which legs are connected by an arcuate bight 28. As will be appreciated, the bracket sections 14 and 16 are of magnetic metallic construction, as a portion of each will be utilized as a portion of the stator flux path, as will be explained more fully below. The bracket sections 14 and 16 are arranged with the legs 18 and 20 projecting towards and overlapping the legs 24 and 26, with the legs being connected together in a manner to be set forth more fully below so as to form a unitary frame from the discrete bracket sections 14 and 16.

A first generally arcuate magnetizable segment 30 having a rear wall conforming to the bight 22 is mounted in the bight 22 with the front arcuate face 32 thereof disposed inwardly and in spaced confrontation with a similar arcuate segment 34 which is mounted in the bight 28. The arcuate segment 34 also has a rear wall which conforms to the bight 28 and a face 36 which confronts the face 32 thereby forming between the faces 32 and 36 an armature-receiving bore 38. The arcuate segments 30 and 34 are of metallic magnetizable material which may be magnetized at a suitable stage of construction of the motor 10 so as to provide permanent magnet segments or poles of opposite polarity for establishing the required field flux. It will be observed particularly in FIGURES 3 and 4, that the magnetizable segments 30 and 34 are disposed in the arcuate bights 22 and 28 respectively with the rear faces thereof in surface-to-surface contact with the bights. This surface-to-surface contact is necessary, of course, to provide the lowest possible reluctance path for the magnetic flux lines as foreign matter or air gaps will cause increased reluctance. The bracket sections 14 and 16 thus form a closed flux path and form a portion of the motor stator. It will be appreciated that our invention may be utilized with fractional horsepower motors other than those utilizing permanent magnets, such as, for example, the wound field type of motor, or alternatively with a permanent magnet type wherein the magnet does not form a portion of the pole itself.

A matrix, generally denoted by reference numeral 40 and preferably of nonmagnetic plastic material, but which may be of magnetic material if so desired, is provided in order to rigidly fasten together the bracket sections 14 and 16 and maintain the magnetizable segments 30 and 34 in place in the bights 22 and 28 so as to form a unitary stator-frame assembly. The matrix 40 is formed in a manner to be discussed hereinafter, in accordance with the method of manufacture contemplated by our invention. The matrix 40 includes portions 42 and 44 which reside between the ends of the permanent segments 30 and 34 so as to maintain the segments in place within the bights 22 and 28. Thus, by referring to FIGURE 4 in particular, it will be observed that the matrix portions 42 and 44 respectively engage one end of each segment, and include lip portions 46 which, together with the portions overlying the ends of the segments will act to retain the segments in place.

Referring further to FIGURE 4, as well as FIGURES 1 and 2, it will be observed that the associated overlap pairs of legs 18, 24, and 20, 26 have aligned apertures therein. The apertures in the inner legs 24 and 26 denoted by reference numeral 48 and the apertures in outer legs 18 and 20 denoted by reference numeral 50. The matrix 40 includes rivet portions 52 which are integrally formed with the portions 42 and 44 and extend outwardly through the aligned apertures 48 and 50 so as to rigidly hold together the bracket sections 14 and 16. Incidentally, it will be noted that the bracket sections are nested with the legs 18 and 20 disposed outwardly of and disposed in surface-to-surface engagement with the legs 24 and 26. But, of course, it would be possible to provide the legs 24 and 26 outwardly of legs 18 and 20 or alternatively provide one leg of bracket section 16 outwardly of and one leg of bracket section 16 inwardly of the legs of bracket section 14. The important thing is that the legs are in either overlapped or substantially contacting relationship so as to complete the flux path mentioned above between the magnets 30 and 34 while providing the lowest possible reluctance in the flux path. Thus, it will be appreciated that the direct surface contact between the associated leg pairs provide the lowest possible reluctance flux path at that location.

The matrix 40 also includes an integrally formed end shield 54 at one open end of the frame 14. By referring to FIGURES 2–4 in particular, it will be readily apparent that the end shield 54 is an integral extension of the matrix portions 42 and 44, and that it is disposed outwardly of the bracket sections 14 and 16 and in closing relationship with the open end thereof. The end shield 54 includes a centrally located housing portion 56 carrying therein a sleeve type bearing 58, and having an opening 60 in alignment with the bearing opening. The bearing 58, carried in the housing 56 of end shield 54 is in coaxial alignment with the bore 38. The end shield 54 further includes flat sides 62 and 64 coextensive with or lying in the same plane as the flat outer side walls of legs 18 and 20. Between these flat sides 62 and 64 are radially extending upper and lower flange portions 66 and 68 respectively, which are formed integrally with the end shield 54 and are useful for mounting the motor 10 in place. Thus, as it will be appreciated that the motor 10 must be mounted in some appliance, it is desirable to have a ready means of mounting the motor in the appliance, and such means is provided by the radially extending flange portion 66 and 68.

Referring now to FIGURE 3 in particular, it will be observed that the matrix 40 also includes upper and lower portions 70 and 72 displaced angularly between the portions 42 and 44 and in abutment with the forward edges of the magnet segments 30 and 40 respectively. The upper and lower portions 70 and 72, by virtue of such abutment with the magnet segments act to further maintain the position of the magnet segments within the bights 22 and 28. It will be appreciated, however, that if longer magnet segments are used, the portions 70 and 72 will be somewhat shorter for the same size bracket sections.

Referring now to FIGURES 1, 2 and 3, it will be observed that a separately formed end shield generally denoted by reference numeral 74 is mounted so as to close the end of the frame 12, as well as to provide a bearing 76 in coaxial alignment with the bore 38 and the bearing 58, the bearing 76 preferably being the same type of bearing as bearing 58. Thus, it will be appreciated that a rotatable assembly which is generally denoted by reference numeral 78 including an armature and commutator mounted on the motor shaft 80 is rotatably disposed within the frame between the bearings 58 and 76 for operation in accordance with conventional operation of a motor of this type. For instance, the rotatable assembly 78 may be of the variety provided in the aforementioned Dochterman application, including an armature 82 and commutator 84. While it was mentioned above that the bore 38 had to be of extremely accurate dimension in order to provide an accurate air gap, such air gap being denoted by reference numeral 86, or that annular area between the armature 82 and the permanent magnets 30 and 34, it is also important for the maintenance of an accurate air gap to provide accurately aligned bearings 58 and 76 for supporting the assembly 78. The bearing 58 is accurately aligned during manufacture of the frame 12, as will be explained below. The alignment of bearing 76, however, is at least partially dependent upon the accuracy with which the end shield 74 is mounted in the frame 12.

In order to accurately mount the end shield 74 in the frame, the matrix 40 includes a shoulder portion 88 which extends axially of the frame sections 14 and 16, as is readily apparent in FIGURES 1–3. The shoulder 88 is annular in shape and provides an internal seat 90 for receiving the end shield 74. The seat 90 is accurately dimensioned during the manufacture of the motor 10 as will be explained below, and will receive the end shield 74 so as to provide the bearing 76 in coaxial relation with the bearing 58 and bore 38. The end shield 74 may be suitably retained in the seat 90 by being glued therein by a suitable glue, or otherwise retained. The opening of the seat 90 is of course large enough to receive the rotatable assembly 78 therethrough, and it will be understood that the "end play" of the rotatable assembly 78 is taken up by providing an accurately controlled dimension between the bearing 58 and bearing 76. In order to so provide the accurately controlled dimension between the aforementioned bearings, the integrally formed end shield 54 and the shoulder 88 are accurately dimensioned, wherein when the end shield 74 is seated in the seat 90 the dimension between the bearings will be controlled.

Referring now specifically to FIGURES 1 and 2, it will be noticed that the shoulder 88 includes portions 92 which extend axially rearwardly into slots 94 formed in the legs 18 and 20 of bracket 14. These extensions 92 are provided to more rigidly fasten together the brackets 14 and 16 as well as to rigidly retain the shoulder 88 in its axial position on the frame 12. Further, it will be noted in FIGURES 1 and 2 that arcuate grooves or cutouts 96 are provided in opposed relationship in the seat 90 adjacent the end shield 74. These cutouts 96 are provided for the purpose of providing ventilation for the motor during operation.

Referring again to FIGURES 1–3, it will be noted that the end shield 74 has mounted on the rear face thereof a pair of similar brush boxes 98, which have slidably mounted therein electrically conductive brushes 100 for contact with the commutator 84. The brush boxes 98 are mounted on the end shield 74 by legs 102 which extend through slots 104 of the end shield 74. Suitable spring means 106 are provided for biasing the brushes 100 into engagement with the commutator, and terminal tabs 108 are fastened over the ends of the brush boxes, closing the ends thereof and extending axially outwardly of the motor for convenient connection of D.C. source to provide energization of the armature. It will be noted that the bights 22 and 28 are each provided with cutout portions or slots 110 therein, and that the shoulder 88 is provided with a pair of opposed slots 112 therethrough communicating with the cutouts or slots 110 for receiving the brush boxes 98 and enabling the end shield 74 to be mounted in the seat 90. Thus, as will be most readily apparent by viewing FIGURES 1 and 3, when the end shield 74 is mounted in the seat 90 the brush boxes 98 are disposed in the cutouts or slots 110, the matrix portions 70 and 72 including portions 114 defining the periphery of the cutouts 110. Further, it will be appreciated that when the end shield 74 is so mounted, the tab 108 extend axially past the end of motor shaft 80, thereby being readily disposed for electrical connection, while not interfering with the shaft 80, and that the edges of the cutouts 112 provide lateral stability for rigidity for the tabs 108.

Referring now to FIGURE 5 and 6, our method of manufacturing the motor 10 will be explained. A precision formed tool or die piece generally denoted by reference numeral 116 is provided, the die piece including a portion 118 having a carefully controlled accurate diameter equal to the desired dimension of bore 38, including the dimension of the armature 82 and the air gaps 86. The die piece 116 further includes a pin 120 extending axially from one end thereof, the pin 120 being round and having its center coaxial with the portion 118. An annular shoulder 122 is provided between the portion 118 and a second portion 124, the portion 124 being of somewhat larger diameter than the portion 118. A second annular shoulder 126 is provided between the portion 124 and a third portion 128, the portion 128 having a diameter equal to one desired dimension of the seat 90. It will be appreciated, of course, that the die piece 116 is illustrated as merely being an exemplification of the type of die piece required, and that the portion 128 for example, will have to be of such configuration to provide the seat 90 with the desired shape.

The motor frame 12 is manufactured or assembled by first establishing the bore having the dimension thereof controlled, the dimension being equal to the diameter of die piece portion 118. Thus, it will be appreciated that illustrated exemplified half-mold portions 130 and 132 are provided to hold the bracket sections 14 and 16 therein and that the sections 14 and 16 are moved radially inwardly until the permanent magnet segments 30 and 34 abut the die portion 118 as illustrated in FIGURE 6. At this time, it will be observed that the segments 30 and 34 rest upon the shoulder 122, the frame or bracket sections 114 and 116 having been arranged in the half-molds 130 and 132 with the legs of each extending towards the legs of the other, or in other words concave inwardly. Thus, it will be appreciated that the segments 30 and 34 are maintained in substantial surface-to-surface contact with the bights 22 and 28 of bracket sections 14 and 16 respectively.

The bearing 58 is maintained at one open end of the frame sections on the pin 120, and is thus in precise coaxial alignment with the bore to be established between the segments 30 and 34. A top mold section 134 having a chamber 136 therein is then moved downwardly over the bearing 58 to the position illustrated in FIGURE 6. The segments 30 and 34 are maintained firmly against the die portion 118 by pressure engagement of the bracket sections 14 and 16 therewith, the pressure being supplied by the mold portions 130 and 132. Further, the mold portion 134 will also be maintained against the top of the mold portions 130 and 132 under pressure. At this time, a suitable unhardened thermally responsive plastic material, such as for example, a thirty percent glass filled nylon material is suitably injected into the mold cavity between the mold portions 130, 132 and 136 in order to form the matrix 40 when hardened. Thus, by referring to FIGURE 6, it will be observed that the aforementioned shoulder 88 is formed between the die portions 128 and mold portions 130 and 132, the matrix portions 70 and 72 are formed between the die portion 124 and the brackets 14 and 16, and the end shield 54, with housing 56, is formed in the cavity 138. It will therefore be appreciated that major tolerances of the motor 10 are related to a single centrally located precision formed die piece 116, and thus that the bore 38 is accurately dimensioned, the bearing 58 is accurately aligned with respect to the axis of the bore 38, and the rotatable assembly 78 will ultimately be accurately aligned between the bearings 58 and 76 to provide a motor having a controlled air gap. Further, it will be appreciated that inasmuch as the legs of the bracket sections 14 and 16 are overlapped, and that the matrix 40 is formed so as to maintain the legs thereof in substantial surface-to-surface contact, a low reluctance flux path will be provided by portions of the overlapped legs of the bracket sections 14 and 16. Still further, it will be appreciated that the matrix 40 formed in the mold provides a unitary rigid internal structure for retaining the accurately positioned relationships between the discrete components of the motor inasmuch as substantially no stresses are set up between the components as are usually encountered in prior art fabrication methods such as welding or the like. Thus, when the die piece 116 is finally withdrawn from the frame assembly after the matrix 40 is hardened, the relationships between the discrete components, i.e., the segments 30, 34, the bearing 58, and the bracket sections 14 and 16 will be retained.

Referring now to FIGURES 7 and 8, two modifications of the end shield 54 are illustrated. Referring first to FIGURE 7, the motor 10 is illustrated including the bracket sections 14 and 16, end shield 54 and housing 56 in which a bearing is supported. The end shield 54, in this instance, is provided with an integrally formed adaptor generally denoted by reference numeral 140. The adaptor 140 is integrally formed with the end shield, which of course is in turn integrally formed with the matrix 40, in the mold structure illustrated in FIGURES 5 and 6. Of course, the mold portion 134 will be modified so as to provide a chamber in which the matrix and end shield material will flow and harden. The adaptor comprises an axially extending leg 142 having a generally centrally located aperture 144 therethrough in substantial alignment with the motor shaft 80. The adaptor is provided so that a desired motion translating mechanism (not illustrated) may be easily mounted directly on the motor so as to transform the rotational motion of shaft 80 to a reciprocating movement, thus to impart this movement to a toothbrush or other device which is to be driven by the motor 10.

Referring now specifically to FIGURE 8, a second modified end shield 54 is illustrated. This modified end shield is illustrated in elevation and is substantially similar to the end shield illustrated in FIGURES 1-4, except that it includes opposed arcuate slots 146 and 148 located so as to be substantially coextensive with the air gaps 86. The slots 146 and 148 are provided in the end shield so that suitable shims (not illustrated) may be provided between the armature 86 and segments 30, 34 when it is desired to magnetize the segments after all the components of the motor are assembled. Thus, if the end shield 74 and the rotatable assembly 78 are assembled with the frame 12 prior to magnetization of the magnetizable segments 30 and 34, it has been found that the motor shaft 80 has a tendency to bend since the armature will be attracted by the applied magnetizing field. The shims are therefore needed in order to prevent such bending of the motor shaft, and of course, the shims will be withdrawn through the slots 146 and 148 after the magnetization of the segments 30 and 34 is completed. The slots 146 and 148 will not effect the operation of the motor, being provided just for the aforementioned purpose.

Referring now to FIGURE 9, a modified manner of retaining together the bracket sections 14 and 16 is illustrated. As explained above, the bracket sections 14 and 16 were respectively provided with apertures 48 and 50 therein in order to provide aligned holes through the overlapped leg portions of the bracket sections, the matrix including rivets 52 formed during the molding process to permanently affix the bracket sections together. However, it has been found that these apertures in the legs of the bracket sections do cause a slight increase in the reluctance of the flux path provided by these overlapped legs. In some applications, the reluctance of the flux path is critical and it has been found necessary to eliminate any holes or apertures in the bracket legs since the holes increase the reluctance of the flux path by providing air gaps therein. Accordingly, it has been found that the bracket sections 14 and 16 can be fixed together by providing a notch 150 in the outer legs 18 and 20 of bracket section 14, which legs overlap the inner legs 24 and 26 of bracket section 16. Further, the legs 18, 20, 24 and 26 are not provided with apertures therein. Further, the mold structure described above is modified so as to provide a seam 152 of the plastic material along the edges 154 of legs 20 and 24, the material also contacting the legs 26 and 24 as illustrated in FIG. 9. The seam 152 also extends into the notch 150 and, since the seam is integrally formed with the internal matrix, the bracket sections 14 and 16 will be fixed together thereby. Further, it will be appreciated that the matrix portions 42 and 44, as well as the portions 70 and 72 will also tend to maintain the fixed relationship between the bracket sections 14 and 16 inasmuch as they contact portions of the inner surfaces of the two bracket sections.

In summary, it should be appreciated that we have provided a small or fractional horsepower permanent magnet type electric motor which is rugged in construction while being fabricated of discrete components to provide increased flexibility of application. The particular motor construction permits the use of permanent magnet segments which are of loose tolerances, yet provide an accurate armature-receiving bore as well as accurate alignment of the end bearings and an accurate air gap between the armature and bore. Further, the exemplified method of manufacturing our motor ensures that established relationships between the discrete components will be maintained as any twisting forces between the components are minimized, thus substantially eliminating potential misalignment therebetween. Further, it will be appreciated that this method is relatively economical and readily adaptable to mass production techniques, and that it is also readily adaptable to fabrication of different size motors and/or motors of various output and of substantially the same size. It will be understood, further, that the embodiment of the invention which has been disclosed and described herein as well as the method which has been disclosed and described is intended for illustrative purposes. It is intended therefor by the appended claims to cover all such modifications that fall within the true spirit and scope of the invention.

What we claim as new and desire to secure by Letters Patent of the United States is:

1. A method of manufacturing a stator-frame assembly for dynamoelectric machines comprising the steps of: holding spaced apart magnetizable segments against the inner surfaces of the bight sections of two inwardly concave frame members composed of magnetic material; moving at least one of said frame members toward the other of said frame members until portions of one frame member contact portions of the other frame member; establishing a desired dimension between the magnetizable sections so as to form an armature-receiving bore of predetermined dimensions; and providing unitary means to fasten together the contacting portions of the two frame members and affix the magnetizable segments in the bight sections of the frame members.

2. The method of claim 1 wherein the step of providing comprises: forming a matrix within said frame members which engages a portion of the inner surfaces of the frame members so as to maintain the contacting portions thereof in fixed relative positions and engages the magnetizable segments so as to mantain the position thereof in the bight sections.

3. The method of claim 1 in which a motor shaft bearing is maintained at one open end of the frame members in coaxial alignment with the central axis of the armature-receiving bore; and forming an end shield at said one open end of the frame members and about the bearing to close said one open end and fixedly maintain the bearing in such coaxial alignment.

4. An electric motor stator-frame assembly adapted to receive a rotatable assembly therein comprising: a hollow frame open at a first end and closed at a second end; said frame including, two inwardly concave brackets of magnetic material, said brackets each having spaced apart legs connected at one of their ends by a bight, the legs of one of said brackets projecting towards and being substantially adjacent associated legs of the other of said brackets thereby providing the bights of each in spaced confrontation; magnetizable means disposed in said bights, said magnetizable means defining an armature-receiving bore having a central axis; matrix means disposed within said casing for affixing said magnetizable means in said bights so as to maintain substantial contact between said magnetizable means and said bights, and said matrix means also joining together said associated legs of said brackets thereby providing a unitary frame structure.

5. The electric motor stator-frame assembly of claim 4 wherein said associated contacting bracket legs are in overlapped relationship, the associated overlapped legs including aligned apertures therethrough, said matrix means including integrally formed rivet means extending through said aligned apertures for joining together said associated overlapped legs.

6. The electric motor stator-frame assembly of claim 5 wherein the aperture in one associated leg of each pair is of substantially greater area than the aperture in the other associated leg of each pair whereby said apertures will remain aligned during relative movement between the pairs of associated legs.

7. The electric motor stator-frame assembly of claim 4 wherein said associated contacting legs are in overlapped relationship, said matrix including integrally formed means for fixing together the pairs of said associated overlapped legs.

8. The electric motor stator-frame assembly of claim 4 wherein said matrix means includes an integrally formed end shield closing said first end of the casing, said end shield including bearing means therein in coaxial alignment with said bore axis.

9. The electric motor stator-frame assembly of claim 8 wherein said end shield includes portions of greater radial dimension than said casing thereby providing flange means, said flange means being provided for mounting of said stator-frame assembly.

10. The electric motor stator-frame assembly of claim 4 wherein said matrix means includes an integrally formed seat extending axially of said casing at the second end thereof, said seat having an opening therein large enough to permit passage of the rotatable assembly therethrough; and a second end shield disposed within said seat opening for closing said second open end of said casing, said second end shield having bearing means in coaxial alignment with said bore axis, and said second end shield further carrying electrical brush means thereon.

11. The electric motor stator-frame assembly of claim 10 wherein each said bight includes a cutout portion therein at the second end of said casing for receiving an axially inwardly extending portion of said second end shield, and said seat including cutout portions associated with said first mentioned cutout portions.

12. The electric motor stator-frame assembly of claim 4 wherein both legs of one of said brackets are nested between both legs of the other of said brackets and in overlapping relationship therewith, the distance between the outer faces of the legs of said other bracket thereby determining the transverse dimension of said frame.

13. The electric motor stator-frame assembly of claim 4 wherein said magnetizable means includes at least a pair of permanent magnet segments, said permanent magnet segments disposed in said bights in close adjacency thereto, and said casing forming at least a portion of the pair of permanent magnet segments, said permanent magnet segments.

14. An electric motor comprising: a stator-frame assembly including two inwardly concave frame sections of magnetic material, said frame sections each including, a pair of spaced apart legs connected at one of their ends by a bight, the legs of one said frame section projecting towards and being in substantial contact with associated legs of the other of said frame sections wherein the inner surfaces of said bights are in spaced confrontation; magnetizable means disposed in said bights, said magnetizable means defining an armature-receiving bore having a central axis; a matrix disposed within said frame sections and affixing said magnetizable means in said bights, said matrix also joining together said contacting legs of said brackets; a first end wall integrally formed with said matrix and closing one end of said stator-frame assembly, said first end wall having first bearing means in coaxial alignment with said bore axis; a second end wall closing the other end of said stator-frame assembly and having second bearing means coaxial with said bore axis; a motor shaft rotatably carried in said first and second bearing means; and an armature and commutator carried on said motor shaft, said armature being received within said bore.

15. An electric motor comprising a pair of bracket sections of magnetic material; said bracket sections being inwardly concave and defining a chamber therebetween; means securing said bracket sections together in confronting relationship, with portions of each bracket section overlapping portions of the other bracket section; permanent magnet means disposed in said chamber with at least one pole portion in each said bracket section, said pole portions defining an armature-receiving bore; said securing means also securing said permanent magnet means in said bracket sections in substantial surface-to-surface contact therewith; and said overlapped portions of said bracket sections defining at least a portion of the magnet flux path between said pole portions.

16. A method of assembling an electric motor of the type having a permanent magnet stator-frame assembly, comprising the steps of: establishing a bore having a predetermined dimension between permanent magnet segments by moving first and second frame sections and the permanent magnet segments until the permanent magnet segments contact a die piece positioned therebetween; and fastening together the first and second frame sections while concurrently mounting the permanent magnet segments within said frame sections so as to fixedly maintain the predetermined bore dimension.

17. The method of claim 16 wherein the step of fastening together the first and second frame sections while concurrently mounting the permanent magnet segments comprises forming a matrix which engages portions of the inner surfaces of both said frame sections as well as of said permanent magnet segments whereby the relative positions thereof are maintained after the die piece is removed from the bore.

18. The method of claim 17 in which a motor shaft bearing is maintained at one open end of the frame sections in coaxial alignment with the established bore; and forming an end shield at said one open end of the frame sections and about the bearing in order to close said one open end and fixedly support the bearing in such coaxial alignment.

19. A method of manufacturing a stator-frame assembly for dynamoelectric machines comprising the steps of: arranging an accurately dimensioned elongate die piece in a preselected position; maintaining magnetizable segments firmly against the die piece by pressure engagement of two inwardly concave frame members with said segments; supporting bearing means in coaxial alignment with the die piece; forming a matrix which engages portions of the inner surfaces of both said frame members as well as of said magnetizable segments whereby the relative positions thereof are maintained after the die piece is removed from the bore.

References Cited

UNITED STATES PATENTS

| | | | |
|---|---|---|---|
| 2,513,226 | 6/1950 | Wylie | 310—154 |
| 3,095,515 | 6/1963 | Case et al. | 310—43 |
| 3,135,887 | 6/1964 | Schaffan | 310—154 |
| 3,156,838 | 11/1964 | Winther | 310—42 |
| 3,256,590 | 6/1966 | Myers | 29—596 |
| 3,278,776 | 10/1966 | Dochterman | 310—154 |

MILTON O. HIRSHFIELD, *Primary Examiner.*

WARREN E. RAY, *Assistant Examiner.*